(No Model.)
W. C. SCOFIELD.
OIL TANK.
No. 286,231. Patented Oct. 9, 1883.
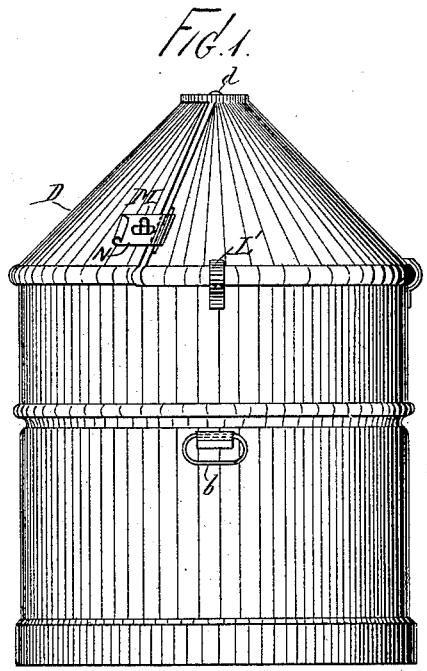
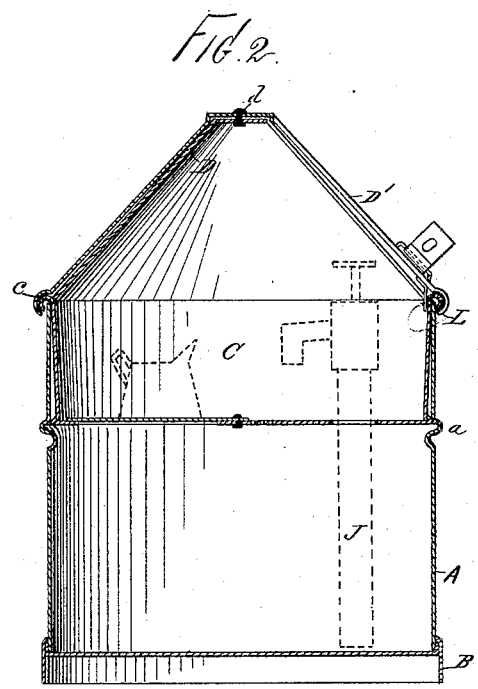
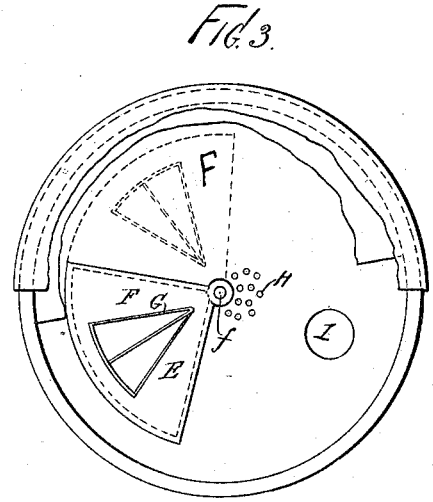
Witnesses
John Buckler,
Wm A. Lowe
Inventor
William C. Scofield.
By Jacob J. Storer.
Attorney.

United States Patent Office.

WILLIAM C. SCOFIELD, OF NEW YORK, N. Y.

OIL-TANK.

SPECIFICATION forming part of Letters Patent No. 286,231, dated October 9, 1883.

Application filed March 6, 1883. (No model.)

*To all whom it may concern:*

Be it known that I, WILLIAM C. SCOFIELD, a citizen of the United States, and a resident of the city, county, and State of New York, have invented a new and useful Improvement in Oil-Tanks, of which the following is a specification.

My invention relates, especially, to that class of tanks employed in retail establishments, or wherever it is desired to keep oil in store in limited quantity, which may be readily and quickly drawn into measures and small cans, and wherein provision is made for pumping the oil from shipping-barrels into the tank; and the object of the invention is to provide a device easy of access to all its parts, and effective and convenient in operation.

To attain this end the invention consists, essentially, in a main receptacle constructed of sheet metal, open at the top. Within the main receptacle is a pan having flaring sides, and provided at top with a turned or beaded edge, which overlaps the rim of the main receptacle, supporting the pan when placed in position. The bottom of the pan is perforated for the introduction of the pump for raising the oil, and with drip-orifices. A section is cut out of the pan-bottom, the opening being covered with a pivoted metal segment, which may be swung to one side when it is desired to fill the tank. Surmounting the removable pan is a conical cover, of sheet metal, one-half of said cover being immovably secured to the rim of the pan. Upon the exterior thereof the other portion is mounted and held in place by a pivot at the apex, and by suitable tongues affixed to interior of the movable portion of the cover and to the exterior of the main receptacle. As heretofore constructed, the movable portion of the conical covers in devices of this class has been arranged to move beneath the fixed part, and has been supported upon an annular rail within the tank; but such an arrangement has been found defective, as the parts become gummed by the spattering of oil, and finally the cover could only be moved with difficulty. By my peculiar construction this difficulty is overcome, as the movable part of the cover is on the exterior of the fixed portion when swung around, and the oil cannot be spattered thereon.

In the drawings, Figure 1 is a side elevation of my improved oil-tank, and Fig. 2 is a vertical axial section thereof. Fig. 3 is a plan view of the tank with a portion of the cover broken away.

Like letters of reference indicate corresponding parts wherever they occur.

A is the main receptacle, constructed of suitable material, and supported upon a projecting hoop, B, in order to keep the bottom of the tank from contact with the floor or other support. The side of the main receptacle may be beaded at *a*, to impart additional strength and rigidity thereto, and is provided with drop-handles *b*, for convenience in moving and lifting the tank.

C is a pan having flaring sides, supported within and upon the rim of the main receptacle by means of a beaded or turned edge, *c*. By forming the pan with flaring sides, it may be easily removed from the main receptacle when necessary. The bottom of pan C is cut away at E, said opening being covered with a movable segment, of metal, F, pivoted to the bottom of the pan at *f*. When it is desired to fill the receptacle with oil or to look therein, segment F may be turned to one side, as indicated by the dotted lines in Fig. 3. Upon the upper surface of segment F is mounted a support, G, upon which a measure may rest while being filled from the tank, thus keeping the measure clean and free from contact with any oil that may be spilled upon the bottom of the pan; and if oil should be spilled it will find its way back into the receptacle through drip-orifices H. I is a hole, through which a pump, J, may pass to the main receptacle.

D is the fixed portion of the cover, forming a half-cone, secured to the rim *c* of pan C. D' is the other half of the cover, the two parts being held together at the apex by a rivet or bolt, *d*. Portion D' of the cover is a little larger in diameter than part D, and will slide thereover when turned around out of the way.

L is a tongue affixed to the interior of D', which presses against the rim of the pan, guiding said portion D' when moved. L' are similar guides, secured to the exterior of the main receptacle.

M is a staple mounted upon portion D of the cover, adapted and arranged to engage with a hasp, N, upon the movable portion, for the purpose of locking or securing the cover against displacement when closed.

Having now fully described my invention, what I claim as new therein, and desire to secure by Letters Patent, is—

1. An oil-tank consisting of a main receptacle, a removable pan having flaring sides and a perforated bottom, supported within the main receptacle, as set forth, and a conical cover, one portion of said cover being secured to the rim of the removable pan, and the other portion pivoted at its apex, and adapted to and arranged to slide upon the exterior of the fixed portion, substantially as shown and described.

2. In an oil-tank of the character herein specified, a removable pan having flaring side walls and a turned or beaded rim, the bottom of said pan being cut away, as shown, and provided with a swinging segment, of metal, bearing a measure-support upon its upper surface, the pan-bottom being perforated by a pump-hole and drip-orifices, the whole surmounted by a conical cover, one portion whereof is fixed, and the other portion adapted and arranged to slide upon the exterior of the fixed portion, substantially as shown and described.

3. In an oil-tank, a main receptacle, A, pan C, having flaring sides and a turned or beaded rim, c, perforation E, segmental cover F, bearing a measure-support, G, drip-orifices H, pump-hole I, a conical cover consisting of a fixed portion, D, and outside movable portion, D', pivot d, and guides L and L', the whole combined and arranged to operate substantially as shown and described.

In testimony that I claim the foregoing as my invention I have signed my name, in presence of two witnesses, this 14th day of February, 1883.

WILLIAM C. SCOFIELD.

Witnesses:
  JACOB J. STORER,
  ALBERT P. MORIARTY.